Patented Dec. 23, 1952

2,622,978

UNITED STATES PATENT OFFICE 2,622,978

METHOD OF ALLOYING HIGH CARBON STEEL AND COPPER

Christopher H. Audette, Minneapolis, Minn.

No Drawing. Application October 31, 1951,
Serial No. 254,205

3 Claims. (Cl. 75—129)

My invention provides a new and useful alloy. More specifically, my invention relates to the successful alloying of high carbon steel and copper, heretofore thought to be incompatible. In my copending patent application, S. N. 189,680, filed October 11, 1950, I disclose a method by which high carbon steel and copper could be alloyed with some degree of success. However, although a union of sorts was brought about by this method, it could not be said to be a complete alloying of the two relatively incompatible metals. My present invention, however, provides a method whereby these two metals may be completely alloyed. This is accomplished by the use of small quantities of blister copper. Blister copper, as is well known, is produced from matte (a crude mixture of sulphides formed in smelting sulphide ores of copper, lead, nickel etc.). Blister copper is known to contain approximately from one to four per cent "impurities." These "impurities" include largely the sulphides of copper, lead, and nickel, as well as extremely small amounts of these metals and other metals in their natural and chemically compounded states. It is not known with certainty by me just which of the impure ingredients of blister copper makes possible the improved alloying which results from my novel method. However, in spite of the fact that the impurities found in blister copper vary somewhat, depending upon the particular ore from which it has been smelted, I strongly believe that it is the sulphides which bring about the desired results—particularly in view of the fact that sulphides, as above pointed out, constitute the greatest part of the impurities of all blister copper and are ever present in varying degrees therein.

While I have found that the precise proportions of high carbon steel and copper, which may be alloyed by my novel method, vary considerably, the best results are achieved by the following method, to wit:

First I place in a crucible and heat to 2860 degrees Fahrenheit approximately six parts of high carbon steel, whereby to bring same to a molten state. The temperature of this steel is then reduced to 2540 degrees Fahrenheit so as not to destroy the properties of the copper. To this molten steel is added approximately ten parts of copper, approximately one and one-fourth parts blister copper, and approximately three parts of copper sulphate. All of the ingredients are then agitated with a carbon element or the like until all have become thoroughly agitated in a molten state—after which the completely alloyed ingredients are poured. The purpose of the copper sulphate is to act as an oxidizing agent, which duty it performs very effectively.

The alloy resulting from the above-defined method is rustproof and has a tensile strength in toughness even greater than high carbon steel or copper. Such a metal has completely avoided modern man and obviously has uses far too numerous to require mention.

What I claim is:

1. The method of alloying copper and high carbon steel which comprises heating said steel to liquify same, adding to said liquified steel an amount of pure copper at least equal to the amount of liquified steel together with relatively small amounts of blister copper and copper sulphate, and thereafter agitating all of said ingredients while same are in a liquid state.

2. The method of alloying copper and high carbon steel which comprises heating said steel to approximately 2860 degrees Fahrenheit whereby to liquify same, reducing the temperature of said molten steel to approximately 2540 degrees Fahrenheit, and thereafter mixing into said molten steel pure copper (in proportions at least equal to that of said molten steel) and relatively small amounts of blister copper and copper sulphate.

3. The method defined in claim 1 in which the molten steel comprises approximately six parts, pure copper approximately ten parts, blister copper approximately one and one-fourth parts, and the copper sulphate approximately three parts.

CHRISTOPHER H. AUDETTE.

No references cited.